United States Patent
Gustafsson

(10) Patent No.: US 11,652,327 B2
(45) Date of Patent: May 16, 2023

(54) INSULATION MACHINING IN A CABLE JOINT

(71) Applicant: NKT HV Cables AB, Lyckeby (SE)

(72) Inventor: Kristian Gustafsson, Karlskrona (SE)

(73) Assignee: NKT HV Cables AB, Lyckeby (SE)

(*) Notice: Subject to any disclaimer, the term of this patent is extended or adjusted under 35 U.S.C. 154(b) by 0 days.

(21) Appl. No.: 17/447,622

(22) Filed: Sep. 14, 2021

(65) Prior Publication Data

US 2021/0408748 A1    Dec. 30, 2021

Related U.S. Application Data

(62) Division of application No. 16/359,367, filed on Mar. 20, 2019, now Pat. No. 11,146,032.

(30) Foreign Application Priority Data

Mar. 27, 2018    (EP) ..................................... 18164157

(51) Int. Cl.
*H01R 43/00*    (2006.01)
*H01B 13/00*    (2006.01)
(Continued)

(52) U.S. Cl.
CPC ......... *H01R 43/00* (2013.01); *H01B 13/0036* (2013.01); *H01R 4/70* (2013.01);
(Continued)

(58) Field of Classification Search
CPC ..................................................... H01R 43/00
See application file for complete search history.

(56) References Cited

U.S. PATENT DOCUMENTS 2,050,888 A    8/1936    Ernst
3,725,162 A    4/1973    Stenzel
(Continued)

FOREIGN PATENT DOCUMENTS

DE    2418025 A1    10/1974
GB    1579196 A  * 11/1980
(Continued)

OTHER PUBLICATIONS

Extended European Search Report; Application No. 18164157.2; Completed: Aug. 8, 2018; dated Aug. 17, 2018; 10 Pages.
(Continued)

*Primary Examiner* — Jeffry H Aftergut
(74) *Attorney, Agent, or Firm* — Whitmyer IP Group LLC

(57) ABSTRACT

A method for improving the properties of a joint between two cable ends having obtaining two cable ends, having uncovered conductors being joined in a connection zone, each cable end also including an uncovered insulation zone including uncovered insulation formed as a cone adjacent the uncovered conductor, covering the conductors with an additional insulation layer, measuring the additional insulation layer and the cones, determining the geometry of the cones and the additional insulation layer based on the measurements, determining a deviation of the geometry from a desired geometry of the cones and the additional insulation layer, where the desired geometry includes a smooth transition between two zones, determining, based on the deviation determination, material to be removed from the cones and the additional insulation layer achieving the desired geometry, and removing the material from the cones and the additional insulation layer.

9 Claims, 4 Drawing Sheets

(51) Int. Cl.
  *H01R 4/70* (2006.01)
  *H02G 15/18* (2006.01)
  *H02G 1/14* (2006.01)
  *H02G 15/08* (2006.01)
  *H01R 4/02* (2006.01)

(52) U.S. Cl.
  CPC ............... *H02G 1/14* (2013.01); *H02G 15/08* (2013.01); *H02G 15/18* (2013.01); *H01R 4/029* (2013.01)

(56) References Cited

U.S. PATENT DOCUMENTS

| | | |
|---|---|---|
| 4,032,380 A | 6/1977 | Olsson |
| 4,084,307 A | 4/1978 | Schultz et al. |
| 2013/0032011 A1 | 2/2013 | Antonischki et al. |

FOREIGN PATENT DOCUMENTS

| | | | |
|---|---|---|---|
| GB | 1579196 A | | 11/1980 |
| GB | 2108329 A | * | 5/1983 |
| JP | 60052588 A | | 5/1975 |
| WO | 2011127978 A1 | | 10/2011 |
| WO | 2015197686 A1 | | 12/2015 |
| WO | WO-2015/197686 A1 | * | 12/2015 |

OTHER PUBLICATIONS

European Office Action; Application No. 18 164 157.2; dated Nov. 4, 2020; 6 Pages.
European Office Action; Application No. 18 164 157.2; dated Jul. 9, 2020; 9 Pages.
Japanese Office Action; Application No. 2019-052348; dated Jan. 25, 2023; dated Jan. 31, 2023; 6 Pages.

* cited by examiner

INSULATION MACHINING IN A CABLE JOINT

TECHNICAL FIELD

The invention relates to electric cables, for instance in relation to high voltages. More particularly, the invention relates to a method, arrangement and computer program product for improving the properties of a joint between two cable ends.

BACKGROUND

The forming of joints between cable ends is today a more or less manual exercise where the jointing is performed in armoring or assembly machines.

One example of a machine that may be used in the forming of a joint is shown WO 2011/127978. In the machine described in this document a cable is received and held in a fixture. A tool is then used for removing material of the cable in order to obtain a smooth transition between a shielding layer and an insulating layer.

Although the document provides some improvements in the forming of a joint, it would be of interest to improve on the obtaining of the joint even further, so that the preparation time is reduced and the quality is improved.

Aspects of the invention are concerned with improvements in relation to the above-described interfaces.

SUMMARY

One object of the invention is therefore to improve the way a joint is obtained.

This is according to a first aspect achieved through a method for improving the properties of a joint between two cable ends, the method being at least partly performed by a robot controlled by robot controller and comprising:

obtaining two cable ends, the conductors of which are uncovered and joined in a connection zone, each cable end also comprising an uncovered insulation zone comprising uncovered insulation formed as a cone adjacent the uncovered conductor, covering the joined conductors with a layer of additional insulation, measuring the layer of additional insulation and the cones, determining the geometry of the cones and the layer of additional insulation based on the measurements, determining a deviation of the geometry from a desired geometry of the cones and the layer of additional insulation, where the desired geometry comprises a smooth transition from the uncovered insulation zones to the connection zone, determining, based on the deviation determination, material to be removed from the cones and the layer of additional insulation achieving the desired geometry, and removing the material from the cones and the additional layer of insulation in order to obtain a joint with improved properties.

The object is according to a second aspect achieved through an arrangement for improving the properties of a joint between two cable ends, the arrangement comprising:

a robot with a robot controller, the robot controller being configured to, control the robot to obtain two cable ends, the conductors of which are uncovered and joined in a connection zone, each cable end also comprising an uncovered insulation zone comprising uncovered insulation formed as a cone adjacent the uncovered conductor, control the robot to cover the joined conductors with a layer of additional insulation, control the robot to measure the layer of additional insulation and the cones, determine the geometry of cones and the layer of additional insulation based on the measurements, determine a deviation of the geometry from a desired geometry of the cones and the layer of additional insulation, where the desired geometry comprises a smooth transition from the uncovered insulation zones to the connection zone, determining, based on the deviation determination, material to be removed from the cones and the layer of additional insulation achieving the desired geometry, and control the robot to remove the material from the cones and the additional layer of insulation in order to obtain a joint with improved properties.

The object is according to a third aspect achieved through a computer program product for improving the properties of a joint between two cable ends, the computer program product comprising computer program code which when run in a robot controller for a robot, causes the robot controller to:

control the robot to obtain two cable ends, the conductors of which are uncovered and joined in a connection zone, each cable end also comprising an uncovered insulation zone comprising uncovered insulation formed as a cone adjacent the uncovered conductor, control the robot to cover the joined conductors with a layer of additional insulation, control the robot to measure the layer of additional insulation and the cones, determine the geometry of the cones and the layer of additional insulation based on the measurements, determine a deviation of the geometry from a desired geometry of the cones and the layer of additional insulation, where the desired geometry comprises a smooth transition from the uncovered insulation zones to the connection zone, determine, based on the deviation determination, material to be removed from the cones and the layer of additional insulation achieving the desired geometry, and control the robot to remove the material from the cones and the additional layer of insulation in order to obtain a joint with improved properties.

The invention according to the above mentioned aspects has a number of advantages. It allows a desired geometry to be obtained in a precise way where there are smooth transitions between the cones and the layer of additional insulation. Thereby the electric fields will be smooth and the reliability of the joint increased. Moreover, the production is fast since the one and the same robot may be used for the different operations. There is thereby no need for moving the cables between differed machines.

In a first variation of the first and second aspects, the geometries of both cones are considered in the determining of material to be removed for obtaining a smooth transition from one uncovered insulation zone to the connection zone.

It is possible that the desired geometry comprises an angle between the cone surface and a longitudinal axis (A) through the conductor.

In a second variation of the first aspect, the removal of material is a removal that retains the angle.

In a corresponding second variation of the second aspect, the robot controller, when controlling the robot to remove material is further configured to control the robot to retain the angle during the removal.

It is furthermore possible that in the desired geometry each cone has a wall with a thickness that decreases towards the connection zone and, in an uncovered insulation zone, the thickness of the cone wall closest to the connection zone is the same as the thickness of the additional layer of insulation at the point where it is closest to said uncovered insulation zone.

The desired geometry comprises a smooth surface of the cones and the additional layer of insulation.

In a further variation of the first aspect, the removing of material may in this case be a removing of material lowering the level of the surface so that holes disappear.

In a corresponding further variation of the second aspect the robot controller when controlling the robot to remove material is further configured to control the robot to lower the level of the surface so that holes disappear.

As yet another alternative it is possible that the desired geometry comprises corrugations on the cones and/or the layer of additional insulation.

In yet another variation of the first aspect, the method further comprises applying secondary insulation around the additional insulation and cone to a level that is aligned with the surface of the cone where its wall is thickest.

In a corresponding variation of the second aspect, the robot controller is further configured to control the robot to apply secondary insulation around the additional insulation and cone to a level that is aligned with the surface of the cone where its wall is thickest.

In still another variation of the first aspect, the obtaining of two cable ends comprises, prior to the covering of the uncovered joined conductors with a layer of additional insulation, connecting the uncovered conductors to each other and forming the insulation cones adjacent the connection zone.

In a corresponding variation of the second aspect, when obtaining the two cable ends, the robot controller is further configured to control the robot to, prior to the covering of the uncovered joined conductors with a layer of additional insulation, connect the uncovered conductors to each other and form the insulation cones adjacent the connection zone.

It should be emphasized that the term "comprises/comprising" when used in this specification is taken to specify the presence of stated features, integers, steps or components, but does not preclude the presence or addition of one or more other features, integers, steps, components or groups thereof.

BRIEF DESCRIPTION OF THE DRAWINGS

The invention will now be described in more detail in relation to the enclosed drawings, in which.

DETAILED DESCRIPTION

In the following description, for purposes of explanation and not limitation, specific details are set forth such as particular architectures, interfaces, techniques, etc. in order to provide a thorough understanding of the invention. However, it will be apparent to those skilled in the art that the invention may be practiced in other embodiments that depart from these specific details. In other instances, detailed descriptions of well-known devices, circuits and methods are omitted so as not to obscure the description of the invention with unnecessary detail.

The invention is generally directed towards an electric cable such as a Direct Current (DC) cable like a High Voltage Direct Current (HVDC) cable, for instance operated at 100 kV and above. It should here be realized that the invention is not limited to these types of electric cables, but may also be used in relation to for instance Alternating Current (AC) cables and for cables at other voltage levels. The invention is more particularly concerned with the forming of a joint between two such cables, which joint may as an example be a so-called factory joint.

Figure 1:
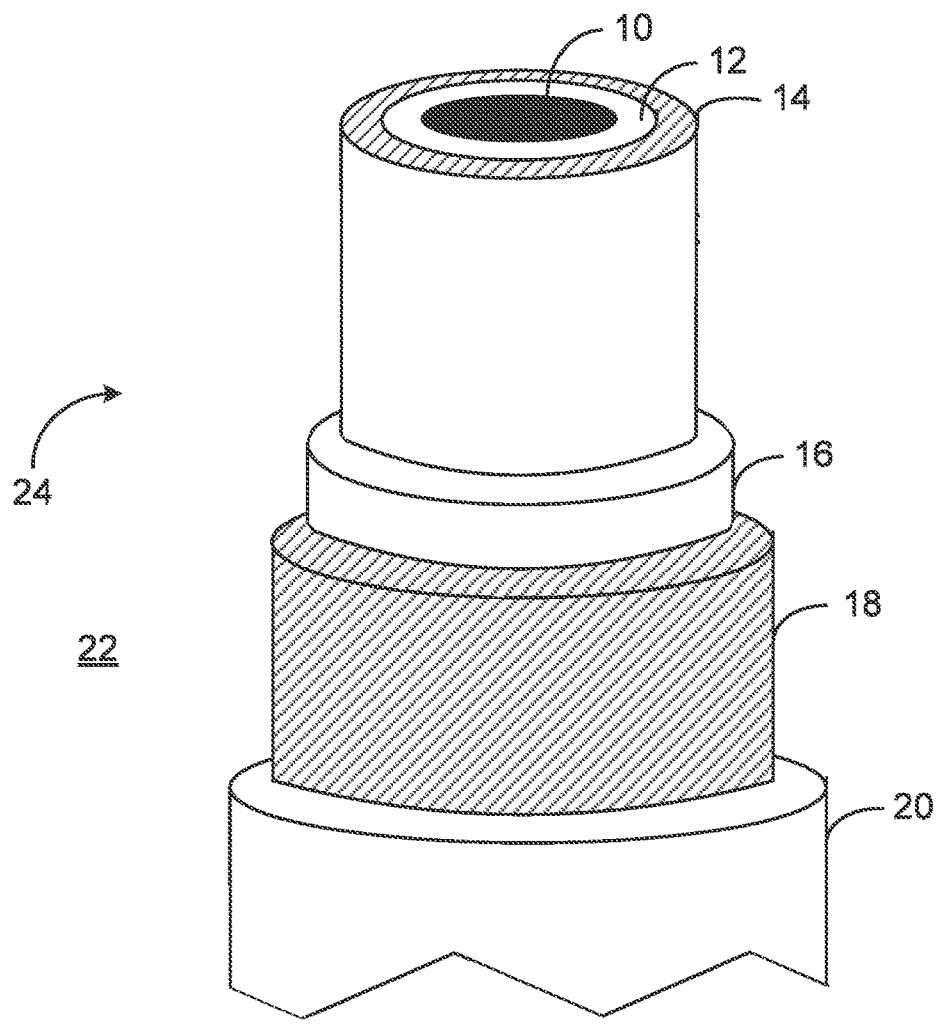
FIG. 1 schematically shows a perspective view of an end of a high voltage DC cable.

FIG. 1 schematically shows an end portion 24 of a first such DC cable 22 that is to be joined with a corresponding end of a similar second DC cable. The cable is an insulated electric high voltage DC cable 22 and comprises from inside and out: a high voltage DC conductor 10, a polymer based insulation system 12-16, a grounding layer 18, and an outer covering or sheath 20. In this example the insulating system comprises a first insulating layer inside a second insulating layer 14 and a third insulating layer 16 outside of the second insulating layer 14. The first insulating layer 12 may be a first semiconductive insulating layer, the second insulating layer 14 may be a main insulating layer and the third insulating layer 16 may be a second semiconductive insulating layer. It should here also be realized that the third layer, i.e., the second semiconductive insulating layer may be omitted.

The polymer based insulation system 12-16 may be extruded, molded, or manufactured in any convenient manner. The main insulating layer 14 may be a crosslinked polyethylene layer, a thermoplastic layer, or a layer of other suitable material.

As was mentioned above the invention is concerned with forming a joint between two such cable ends.

Figure 2:
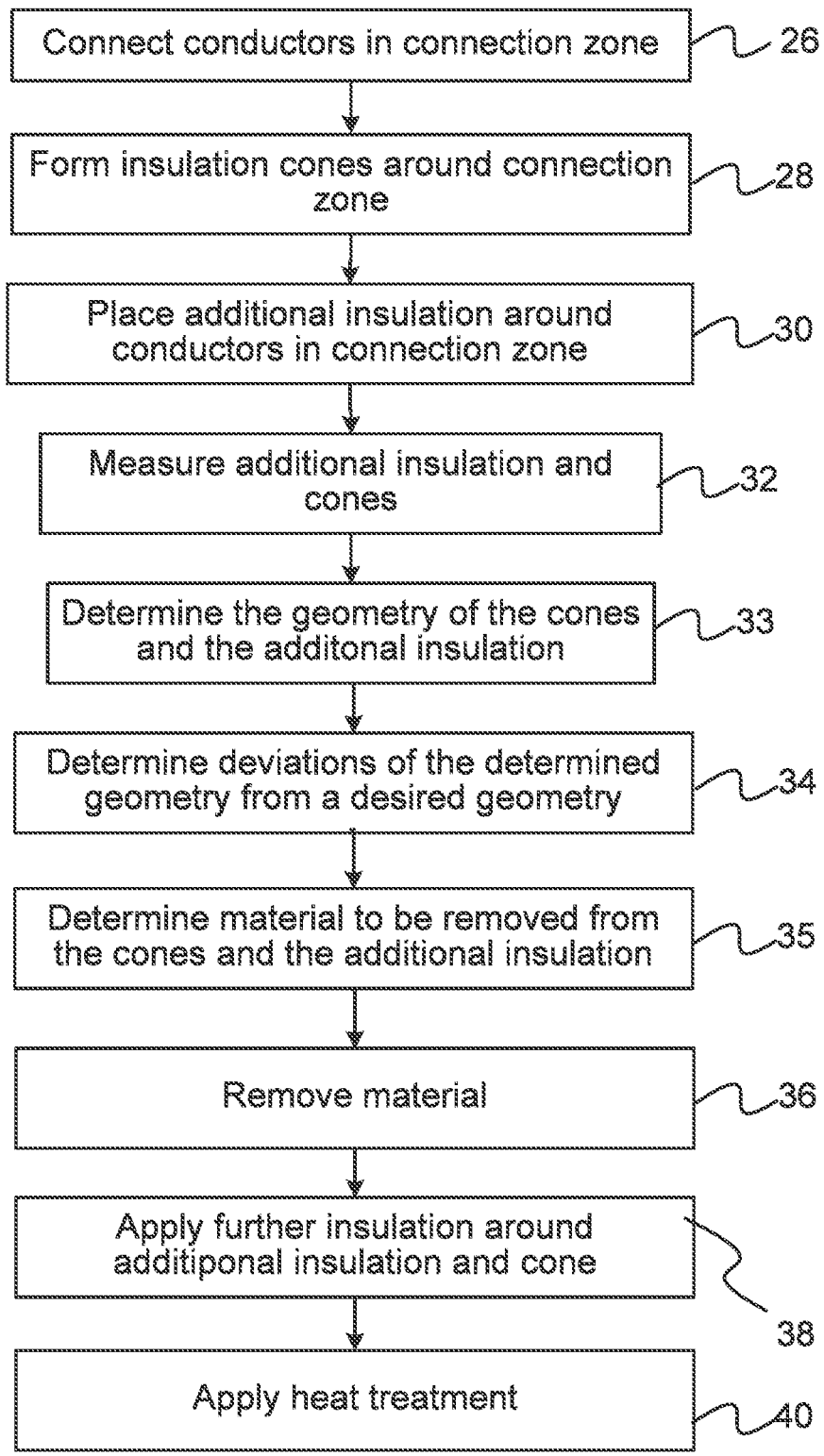
FIG. 2 is a schematic flow scheme of a number of method steps used in the forming of a joint between two cable ends, FIG. 3 schematically shows the forming of a connection between the conductors of the joint in a connecting zone using a robot being controlled by a robot controller, FIG. 4 schematically shows the forming of insulation cones around the connecting zone using the robot, FIG. 5 schematically shows the forming of an additional insulation layer in the connection zone using the robot, FIG. 6 schematically shows a number of measurement points on the insulation cones and the additional insulation layer in the connecting zone for measuring the cones and additional insulation layer, FIG. 7 schematically shows removal of material from of a cone for obtaining a desired geometry of the cones and additional insulation layer, and FIG. 8 schematically shows the adding of further insulation above the cones and additional insulation layer.

FIG. 2 shows a number of method steps used in the forming of a joint between two cable ends, where at least some of the steps are being performed by a robot under the control of a robot controller in a method of improving the properties of a joint between two cable ends.

The operations performed on the cables by the robot are thus controlled by a robot controller, which also performs calculations in relation to at least some of these operations. This combination of robot and robot controller also forms an arrangement for improving the properties of a joint between two cable ends.

In order to obtain the joint it may be necessary to remove the above mentioned grounding layer 18 and sheath 20 from the cable end 24 for obtaining a connection zone in which a connection between the two conductors 10 of two cables are to be made. In order to obtain the connection zone it may also be necessary to remove the insulating system, i.e., the first and second semiconductive insulation layers 12 and 16 and the main insulating layer 14. Such removal may be performed by the robot using a cutting tool (not shown). Here it may also be mentioned that it is possible that more of the sheath, grounding and second semiconductive insulation layers may be removed than the first semiconductive insulation layer and the main insulation layer, so that this first semiconductive insulation and main insulation layers may extend beyond the edge of the sheath, grounding layer and the second semiconductive layer. Thereby each cable may comprise a part of the connection zone, such as half of the connection zone and an uncovered insulation zone, i.e., a zone where insulation is uncovered and in this case where the second layer of insulation is uncovered. This uncovered insulation zone is also neighboring the uncovered conductor. The uncovered insulation zone may thus be placed adjacent the connection zone. The connection zone thus comprises the uncovered conductors of the two cable ends and this connection zone is surrounded by two uncovered insulation zones, which in turn transition into the non-tampered part of the cable where no layer removal has been made.

Figure 3:
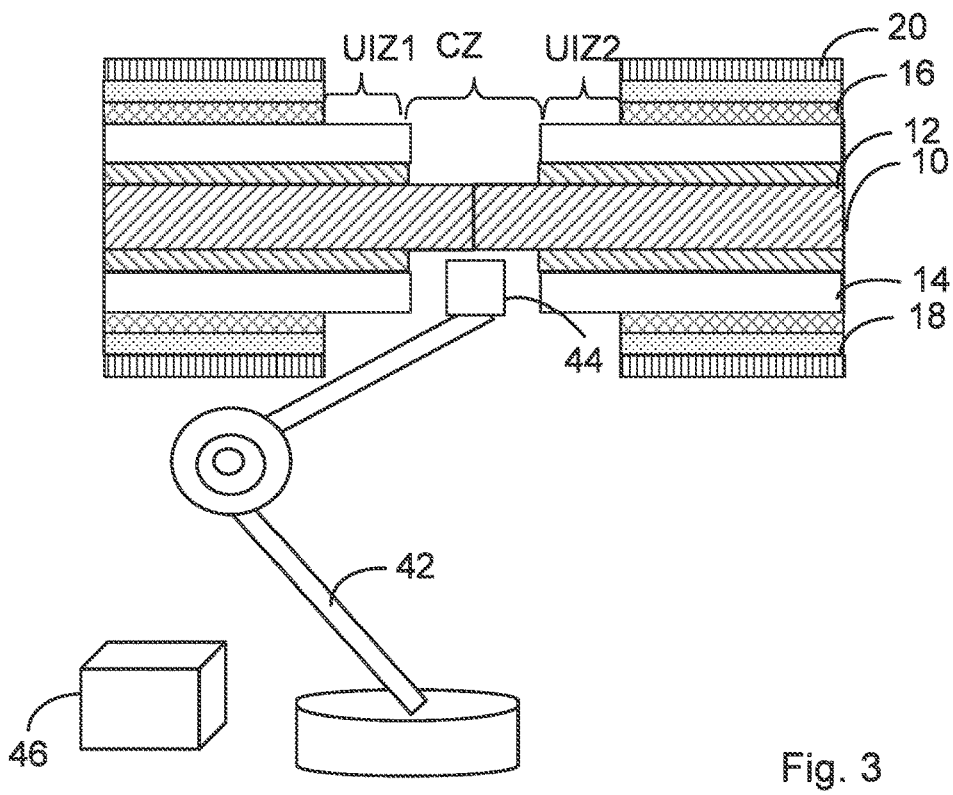

FIG. 3 schematically shows the robot 42 with robot controller 46 handling the jointing of the cables, where there is a connection zone CZ with the uncovered conductors 10 of two cables that are to be connected and the connection zone CZ is surrounded by a first and a second uncovered insulation zone UIZ1 and UIZ2 with remaining first semiconductive insulation 12 and main insulation 14 but removed second semiconductive insulation 16, ground layer 18 and sheath 20. In the uncovered insulation zone, the insulation has been uncovered so that it may be exposed to air. In this case it can be seen that the main insulation layer 14 is exposed to air. The first and second uncovered insulation zones UIZ1 and UIZ2 thereafter transitions into unaltered or non-tampered cable sections, i.e., cable sections without material being removed.

It may here be mentioned that the robot 42 as well as the sections and layers and are not to scale.

After the layers have been removed in the above described way from the uncovered insulation zones UIZ1 and UIZ2, and when all material except the conductors have been removed from the connection zone CZ, i.e., only the conductors 10 remain in this zone CZ, the robot 42 connects these conductors, step 26. This is schematically illustrated in FIG. 3. For this purpose the robot 42 may be equipped with a first tool 44 for connecting the conductors 10 with each other. The connecting tool may with advantage be a welding tool used to weld the two conductors to each other, where the welding may as an example be Tungsten Inert Gas (TIG) or Metal Inert Gas (MIG) welding.

Figure 4:
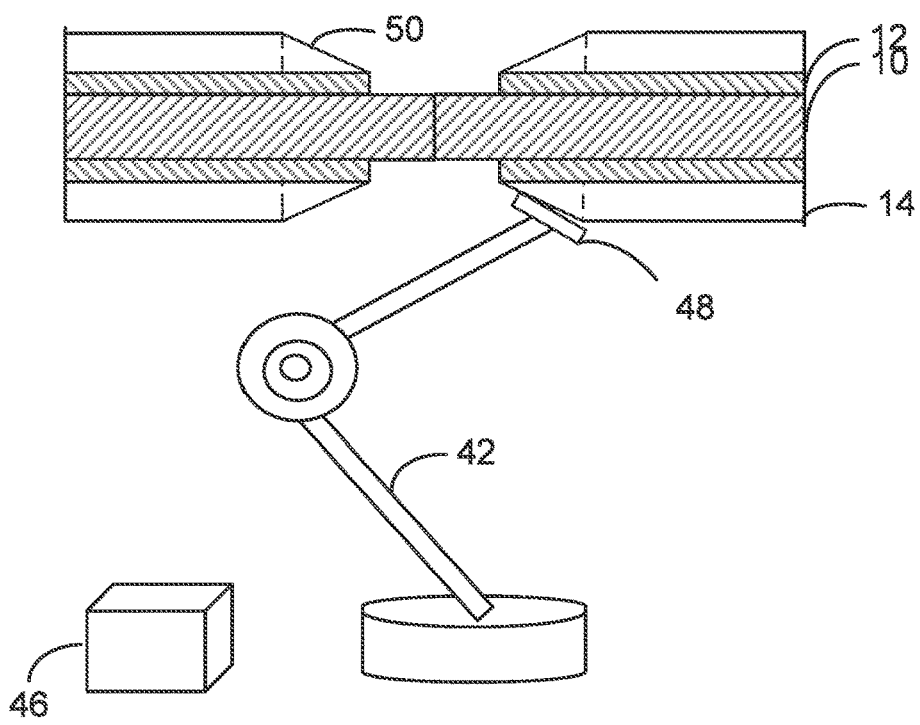

Thereafter follows the forming of insulation cones, which cones may be truncated cones. The cones may be obtained through shaping the second insulation layer 14 in the uncovered insulation zones UIZ1 and UIZ2 into the shape of a cone 50, step 28. This shaping is schematically shown in FIG. 4. For this reason the robot 42 may be equipped with a second tool 48 that is used to cut and/or smooth the surface of the main insulation layer 14 into the shape of a cone 50. This type of shaping is made in the uncovered insulation zone on both cable ends. A cone can also be seen as being provided with a wall having a thickness that diminishes or decreases towards the connection zone CZ.

It can thus be seen that two cable ends have been obtained where the conductors are uncovered and connected in the connection zone CZ and where the cable ends each also comprises an uncovered insulation zone UIZ1 and UIZ2 comprising uncovered insulation 14 formed as a cone 50 neighboring or adjacent the uncovered conductor 10 in the connection zone CZ.

After the above mentioned measured have been performed, it is then necessary to place additional insulation around the joined conductors in the connection zone CZ, step 30.

Figure 5:
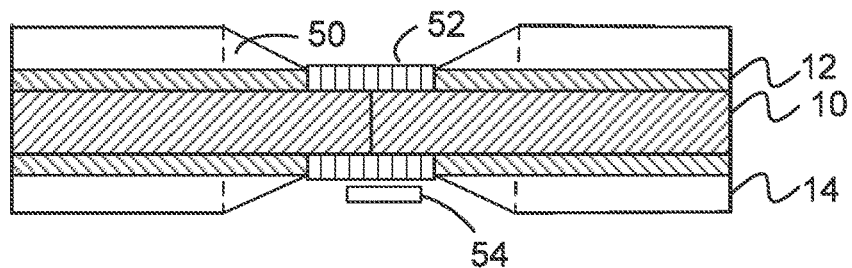
Figure 6:
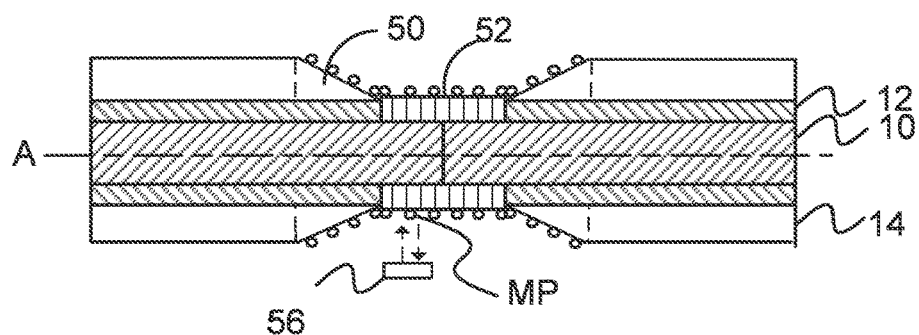

The placing of additional insulation 52 may involve placing additional insulation of the same type as was used in the first insulating layer of the cable. This means that in the present example, the additional insulation 52 would be semiconductive insulation that is placed in the connection zone CZ around the joined conductors 10. This is schematically shown in FIG. 5. The placing may be carried out through the robot 42 employing a third tool 54 that winds sheets of additional insulation around the joined conductors, such as winding sheets of cellulose or polymer paper comprising carbon black particles around the conductors-. The layer 52 of additional insulation material thereby obtained is here provided in a thickness that is roughly equivalent to the inner diameter of the cone 54. The application may in this case not be exact.

Thereafter the robot 42 uses a fourth tool 56, which may comprise an ultrasonic sensor, in order to measure the additional insulation layer and the cone, step 32, which measuring may involve measuring the thickness of the additional insulation layer 52 in the connection zone CZ as well as thickness of the cones 50 in the uncovered insulation zones UIZ1 and UIZ2, step 32. There may because of this be defined a number of measurement points MP along the surface of the cones 50 and the surface of the additional insulation 52. The measurement points MP may more particularly be provided radially around as well as axially along a longitudinal axis A defined by the conductors 10 of the joint.

A measurement point may as an example be defined on the surface of a cone 50 at an axial position along the longitudinal axis A. A number of measurement points of the cone surface surrounding the axis at the same axial position may become a set of measurement points. The points may in this case follow a curve defined by the shape of the cone, such as a circle, which curve may be provided in a plane that is perpendicular to the axis A. A number of such sets of measurement points may then be defined on the surfaces of the cones 50 along the axis A in the first and second uncovered insulation zones UIZ1 and UIZ2 as well as on the surface of the additional insulation layer 52 in the connection zone CZ. The surfaces are in this case the outer surfaces, i.e., the surfaces facing away from the axis A.

The measurements may be made through the robot 42 moving the tool 56 between measurement points. As an alternative it is possible that the robot is moved axially between the two uncovered insulation zones UIZ1, UIZ2 while the cable ends 24 are being rotated by a machine.

Based on the measurements obtained from the measurement points MP, the robot controller 46 then forms a model of the geometry of the cones 50 in the uncovered insulation zones UIZ1, and UIZ2 and the additional insulation layer in the connection zone CZ, step 33.

The robot controller 46 may therefore determine the shapes of the cones and the additional insulation layer as well as the thicknesses of the cone walls and additional insulation layer. It may also detect any protrusions or holes in the outer surface of the cones and the additional insulation layer.

Based on the information from the measurements, the robot controller 46 thus builds a model, such as threedimensional model of the cones and additional insulation in which models the shapes, including any surface irregularities, and thicknesses of theses element are defined.

The robot controller 46 may thereafter determines a deviation of the model geometry from a desired geometry of the cones and layer of additional insulation, step 34, where the desired geometry comprises a smooth transition from the uncovered insulation zones to the connection zone.

A desired geometry may be a geometry where protrusions and holes have been removed from the surfaces of the cones and additional insulation layer. It may additionally be the achieving of a desired surface quality, which desired surface quality may be that the surface is smooth. As an alternative a desired surface quality may be a surface of the cones and/or the additional insulation layer having corrugations.

A desired cone geometry may comprise a desired cone shape and a desired shape of the additional insulation. A desired cone shape may be based on using a desired angle of inclination a of the outer surface of a cone 50 to the longitudinal axis A defined by the conductor 10. Also the additional insulation may have a desired shape relating to an angle of inclination. However, in this case the desired angle of inclination is zero as the outer surface is parallel with the axis A. A desired shape of the additional insulating layer may be a cylinder shape with a desired thickness. A desired cone shape may comprise a smooth surface or a corrugated surface at the desired angle of inclination and a desired shape of the additional insulation may also comprise a smooth or corrugated surface.

A cone may have a nominal shape defined by the abovementioned angles and the measurements being made in an uncovered insulation zone may lead to deviations of the cone surface from this shape through the occurrence of protrusions and holes. It is in the same way possible that the measurements being made of the additional insulation layer may lead to deviations of the measured insulation layer surface from the desired insulation layer surface shape through the occurrence of protrusions and holes.

Another possible deviation is that the desired surfaces are to comprise corrugations, while the surfaces of the model do not.

Thereafter the robot controller 46 determines material to be removed from the cones 50 and the additional insulating layer 52 that achieves the desired geometry based on the deviation determination, step 35.

The determination may therefore involve a determination of material to be removed that achieves the desired cone shape and additional insulation shape.

If the desired shapes comprise smooth surfaces then this may be achieved through removing material to a level below the surface of the model where no holes remain. This removal may then also be made while retaining the same angle of inclination. The determination may thus be a determination of amount of removal of material from a cone 50 that retains the angle α while providing a smooth cone surface together with removal of material from the semiconductive insulation layer 52 that makes the radial surface of the semiconductive insulation layer smooth.

In another variation, holes and protrusions are still removed, while at the same time introducing corrugations.

Moreover as one aspect of the desired geometry is that there should be a smooth or seamless transition from the uncovered insulation zones to the connection zone, i.e., that there is a seamless transition from a cone 50 to the additional insulation layer 52, the edge of a cone 50 adjacent the connection zone CZ has to be flush with the outer periphery of the semiconductive insulation layer 52 of the connection zone CZ. The edge of the outer surface of the cone 50 in an uncovered insulation zone UIZ1 or UIZ2 being closest to the connection zone CZ thus has to be flush with the outer surface of the additional insulation layer 52. This means that the core surface at this edge, is to have the same radial distance to the longitudinal axis A as the additional insulation layer 52 This condition is required for both cones. Put differently, it can be seen that in an uncovered insulation zone the thickness of the cone wall closest to the connection zone CZ is the same as the thickness of the additional insulation layer at the point where it is closest to this uncovered insulation zone.

In the case of obtaining a smooth surface, this means that if the amount of material needed to be removed from a cone 50 while retaining the profile leads to the part of the outer surface of a cone that is closest to the connection zone CZ having a first distance to the axis A and the determination of the amount of material needed to be removed from the connection zone CZ leads to the outer surface of the additional insulating layer 52 having a second distance to the longitudinal axis, then more material has to be removed from the additional insulating layer 52 if the second distance is higher than the first distance, even though a material removal corresponding to the second distance is sufficient for obtaining a smooth surface. In an analogous manner more material has to be removed from the cone, while retaining the desired angle if the first distance is longer than the second distance.

As this consideration has to be made for both cones, the consideration made above regarding the first and second distances associated with one cone and the additional insulation layer 52 has to at the same time include a consideration of a third distance of a second cone corresponding to the first distance. The element having the lowest distance to the axis A, such as one of the cones or the additional insulation layer, is then decisive for the determination of material to be removed also from the other elements. It can thereby also be seen that the geometries of both cones are considered in the determining of material to be removed for obtaining a smooth transition from one uncovered insulation zone to the connection zone.

Figure 7:
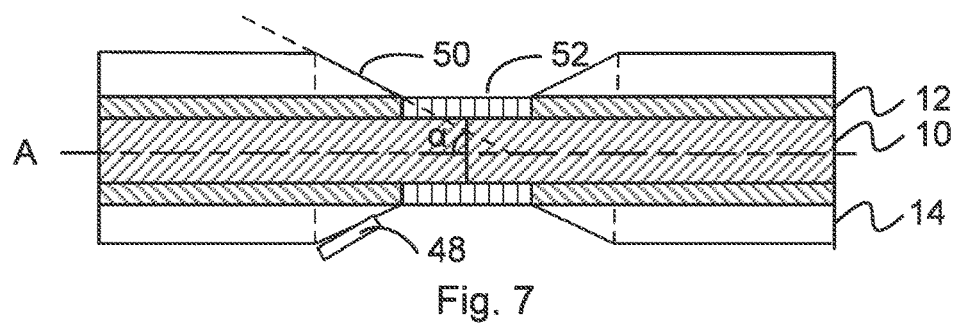

After having determined the material removal that achieves the desired geometry, the robot controller 46 then controls the robot 42 to remove the material for obtaining the desired shape, step 36. In this case it is possible that the second tool 48 is reused, as is shown in FIG. 7. Here also the angle α is shown.

Figure 8:
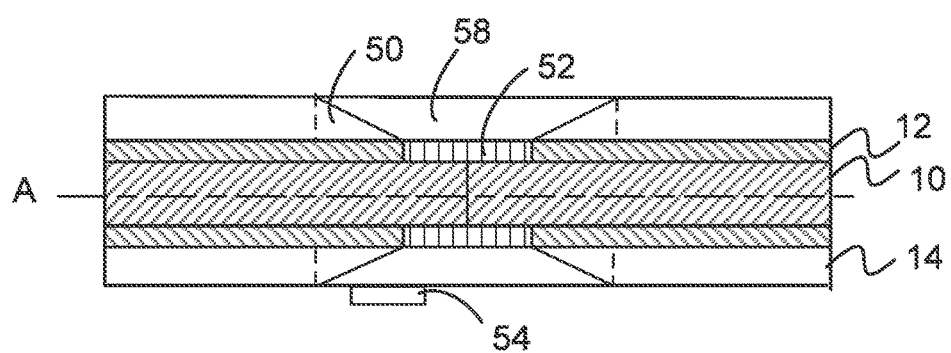

Thereafter the robot 42 applies further insulation 58 around the cones 50 and the additional insulation layer 52 in the connecting section CZ so that the insulation is aligned with insulation of the cable, step 38. This further insulation is with advantage of the same type as the insulation used in the second insulation layer 14 of the cable, i.e., the same material as is present in the cones 50. This may be done using the third tool 48 and winding strips of insulation round the cones and semiconductive insulation. This is schematically shown in FIG. 8.

Thereafter may follow a heat treatment of the applied insulation as well as the application of a ground layer and sheath. In all these latter steps the same robot may be used.

It can in this way be seen that the desired geometry is obtained in a precise way where there are smooth transitions between the cones and the additional insulation layer and smooth or corrugated surfaces. Thereby the electric fields will be smooth and the reliability of the joint increased. Moreover, the production is fast since the same robot may be used for the different operations. There is thereby no need for moving the cables between differed machines.

Here it may also be mentioned that although different tools were described above, it is possible to use a multipurpose tool having cutting, smoothing and winding functionality, in which case the speed may be increased even further.

There are a number of variations that are possible apart from those already discussed. It is for instance possible that the initial step of removing material and forming of cones are not performed using a robot, but instead are carried out in one or two dedicated machines. It is also possible that the applying of ordinary insulation above the cones and the semiconductive insulation layer is performed in a dedicated machine.

It is also possible that the application of the semiconductive insulation layer in the connection zone is performed in a separate machine.

It is thus possible that only the measuring and the removal of material in order to obtain a desired shape are actually performed by the robot.

Another possible variation is that the semiconductive insulation being applied is not being wound as strips. It may be applied as a number of blocks that fit into each other when being placed around the connected conductors.

The robot controller may be implemented as a processor with associated program memory comprising computer instructions for implementing its functionality.

The robot controller may therefore be provided in the form of a processor with associated program memory including computer program code for performing its functionality. It may also be provided in the form of a digital signal processor (DSP), Application Specific Integrated Circuit (ASIC) or Field-Programmable Gate Array (FPGA).

Figure 9:
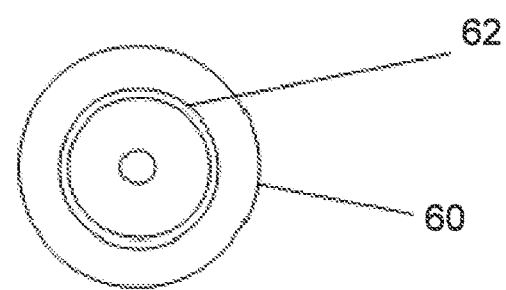
FIG. 9 shows a computer program product in the form of a CD ROM disc with a computer program performing the functionality of the control unit of the remote control device.

A computer program may also be a computer program product, for instance in the form of a computer readable storage medium or data carrier, like a CD ROM disc or a memory stick, carrying a computer program with the computer program code, which will implement the functionality of the above-described robot controller when being loaded into a processor. One such computer program product in the form of a CD ROM disc 60 with the above-mentioned computer program code 62 is schematically shown in FIG. 9.

A computer program product may also be a program provided via a server and downloaded therefrom to the robot controller.

While the invention has been described in connection with what is presently considered to be most practical and preferred embodiments, it is to be understood that the invention is not to be limited to the disclosed embodiments, but on the contrary, is intended to cover various modifications and equivalent arrangements. Therefore, the invention is only to be limited by the following claims.

The invention claimed is:

1. An arrangement for improving properties of a joint between two cable ends, the arrangement comprising:
    a robot with a robot controller, the robot controller being configured to, control the robot to obtain two cable ends, conductors of which are uncovered and joined in a connection zone (CZ), each cable end also having an uncovered insulation zone (UIZ1, UIZ2) including uncovered insulation formed as a cone adjacent the uncovered conductor,
    control the robot to cover the joined conductors with a layer of additional insulation,
    control the robot to measure the layer of additional insulation and the cones,
    determine a geometry of cones and the layer of additional insulation based on measurements,
    determine a deviation of the geometry from a desired geometry of the cones and the layer of additional insulation, where the desired geometry includes a smooth transition from the uncovered insulation zones to the connection zone,
    determining, based on the deviation determination, material to be removed from the cones and the layer of additional insulation achieving the desired geometry, and
    control the robot to remove said material from the cones and the additional layer of insulation in order to obtain a joint with improved properties.

2. The arrangement according to claim 1, wherein the geometries of both cones are considered in the determining of material to be removed for obtaining a smooth transition from each uncovered insulation zone to the connection zone.

3. The arrangement according to claim 1, wherein the desired geometry includes an angle ($\alpha$) between a cone surface and a longitudinal axis (A) through the conductor and the robot controller, when controlling the robot to remove material is further configured to control the robot to retain the angle during the removal.

4. The arrangement according to claim 1, wherein in the desired geometry each cone has a wall with a thickness that decreases towards the connection zone (CZ) and, in the uncovered insulation zone, the thickness of the cone wall closest to the connection zone is the same as the thickness of the additional layer of insulation at the point where it is closest to said uncovered insulation zone.

5. The arrangement according to claim 1, wherein the desired geometry includes a smooth surface of the cones and the additional layer of insulation and the robot controller when controlling the robot to lower a level of the surface so that holes disappear.

6. The arrangement according to claim 1, wherein the desired geometry includes corrugations on the cones and/or the layer of additional insulation.

7. The arrangement according to claim 2, wherein the desired geometry includes an angle ($\alpha$) between a cone surface and a longitudinal axis (A) through the conductor and the robot controller, when controlling the robot to remove material is further configured to control the robot to retain the angle during the removal.

8. The arrangement according to claim 2, wherein in the desired geometry each cone has a wall with a thickness that decreases towards the connection zone (CZ) and, in the uncovered insulation zone, the thickness of the cone wall closest to the connection zone is the same as the thickness of the additional layer of insulation at the point where it is closest to said uncovered insulation zone.

9. A computer program product for improving properties of a joint between two cable ends, the computer program product comprising:
    a non-transitory computer-readable storage medium; and
    a computer program code stored on the non-transitory computer-readable storage medium and configured to, when run in a robot controller for a robot, cause the robot controller to:
    control the robot to obtain two cable ends, conductors of which are uncovered and joined in a connection zone (CZ), each cable end also having an uncovered insulation zone (UIZ1, UIZ2) including uncovered insulation formed as a cone adjacent the uncovered conductor,
    control the robot to cover the joined conductors with a layer of additional insulation, control the robot to measure the layer of additional insulation and the cones, determine a geometry of the cones and the layer of additional insulation based on measurements, determine a deviation of the geometry from a desired geometry of the cones and the layer of additional insulation, where the desired geometry includes a smooth transition from the uncovered insulation zones to the connection zone, determine, based on the deviation determination, material to be removed from the cones and the layer of additional insulation achieving the desired geometry, and control the robot to remove said material from the cones and the additional layer of insulation in order to obtain a joint with improved properties.

* * * * *